(12) United States Patent
Gawel

(10) Patent No.: US 9,939,574 B2
(45) Date of Patent: Apr. 10, 2018

(54) LIGHTING SYSTEM

(71) Applicant: NOVOMATIC AG, Gumpoldskirchen (AT)

(72) Inventor: Marek Gawel, Gumpoldskirchen (AT)

(73) Assignee: NOVOMATIC AG, Gumpoldskirchen (AT)

( * ) Notice: Subject to any disclaimer, the term of this patent is extended or adjusted under 35 U.S.C. 154(b) by 0 days.

(21) Appl. No.: 15/110,817

(22) PCT Filed: Jan. 8, 2015

(86) PCT No.: PCT/EP2015/050252
§ 371 (c)(1),
(2) Date: Jul. 11, 2016

(87) PCT Pub. No.: WO2015/104331
PCT Pub. Date: Jul. 16, 2015

(65) Prior Publication Data
US 2016/0327728 A1    Nov. 10, 2016

(30) Foreign Application Priority Data

Jan. 10, 2014 (DE) .................... 20 2014 000 196 U
Jan. 13, 2014 (DE) .................... 20 2014 000 264 U

(51) Int. Cl.
*F21S 4/22*        (2016.01)
*G09F 13/18*       (2006.01)
(Continued)

(52) U.S. Cl.
CPC ............ *G02B 6/0055* (2013.01); *F21S 2/005* (2013.01); *F21S 4/22* (2016.01); *F21V 21/005* (2013.01);
(Continued)

(58) Field of Classification Search
CPC . F21Y 2103/10; G02B 5/0257; G02B 6/0013; G02B 6/0018; G02B 6/0021;
(Continued)

(56) References Cited

U.S. PATENT DOCUMENTS 4,532,579 A * 7/1985 Merryman ............ F21V 21/005
                                                      362/239
5,134,549 A * 7/1992 Yokoyama ........... G02B 6/0043
                                                      362/223
(Continued)

FOREIGN PATENT DOCUMENTS

DE       3223706      12/1983
DE       69307779     8/1997
(Continued)

OTHER PUBLICATIONS

International Search Report for PCT/EP2015/050252, English translation attached to original, Both completed by the European Patent Office dated Dec. 14, 2015, All together 9 Pages.

*Primary Examiner* — Hargobind S Sawhney
(74) *Attorney, Agent, or Firm* — Brooks Kushman P.C.

(57) ABSTRACT

A lighting system including a lighting panel, wherein at least one light source, assigned to a narrow side of the lighting panel, is provided for coupling light into the lighting panel. The lighting system also includes a reflector facing a flat side of the lighting panel, wherein the flat side of the lighting panel facing the reflector and/or the reflector and/or an intermediate layer between the reflector and the lighting panel is provided with a surface structure. The surface structure is formed as a line grid made of continuous and intersecting grid lines. According to the lighting system, a high level of homogenization of the light emission from the lighting panel can be achieved in a simple manner. In this (Continued)

way, in particular, greater transmission losses in the edge regions of the lighting panel are prevented.

19 Claims, 6 Drawing Sheets

(51) Int. Cl.
*F21V 8/00* (2006.01)
*F21S 2/00* (2016.01)
*F21V 21/005* (2006.01)
*F21V 33/00* (2006.01)

(52) U.S. Cl.
CPC .......... *F21V 33/006* (2013.01); *G02B 6/0035* (2013.01); *G02B 6/0043* (2013.01); *G02B 6/0068* (2013.01); *G02B 6/0081* (2013.01); *G09F 13/18* (2013.01); *G02B 6/0076* (2013.01)

(58) Field of Classification Search
CPC .. G02B 6/0028; G02B 6/0031; G02B 6/0033; G02B 6/0035; G02B 6/0038; G02B 6/0043; G02B 6/0055; G02B 6/0068; G02B 6/0071; G02B 6/0073; G02B 6/0076; G02B 6/0081; G02F 2001/133314; G09F 13/18; F21S 2/005; F21S 4/006; F21S 4/10; F21S 4/22; F21V 11/14; F21V 21/005
See application file for complete search history.

(56) References Cited

U.S. PATENT DOCUMENTS

| | | | |
|---|---|---|---|
| 5,647,655 A | 7/1997 | Kashima et al. | |
| 5,808,708 A * | 9/1998 | Oyama | G02B 6/0018 349/62 |
| 5,876,107 A | 3/1999 | Parker et al. | |
| 6,536,924 B2 * | 3/2003 | Segretto | F21S 2/005 362/247 |
| 6,988,813 B2 | 1/2006 | Hoelen et al. | |
| 7,080,927 B2 * | 7/2006 | Feuerborn | F21S 2/005 362/238 |
| 7,322,873 B2 * | 1/2008 | Rosen | A63H 33/042 446/124 |
| 7,852,011 B2 * | 12/2010 | Peng | H05B 33/0803 315/185 R |
| 8,789,971 B2 * | 7/2014 | Lo | F21S 4/006 315/312 |
| 8,915,634 B2 * | 12/2014 | Hsu | F21V 5/002 345/102 |
| 9,019,718 B2 * | 4/2015 | Bdeir | H01R 13/6205 361/792 |
| 9,595,828 B2 * | 3/2017 | Binder | A63F 9/24 |
| 9,597,607 B2 * | 3/2017 | Bdeir | H01R 13/6205 |
| 2005/0259428 A1 | 11/2005 | Haas | |
| 2006/0067090 A1 * | 3/2006 | Lee | F21V 7/0091 362/615 |
| 2007/0217209 A1 * | 9/2007 | Wong | H05B 33/0842 362/418 |
| 2008/0205059 A1 * | 8/2008 | Tsuji | F21V 21/002 362/249.01 |
| 2010/0118519 A1 * | 5/2010 | Yi | G02B 6/0038 362/97.3 |
| 2012/0287631 A1 | 11/2012 | Sheng | |
| 2013/0194806 A1 * | 8/2013 | Smith | F21V 21/14 362/249.03 |
| 2013/0242608 A1 * | 9/2013 | Chen | G09F 13/18 362/611 |
| 2015/0173142 A1 * | 6/2015 | Van Der Veen | H05B 33/0851 315/151 |

FOREIGN PATENT DOCUMENTS

| | | |
|---|---|---|
| DE | 60222678 | 7/2008 |
| EP | 0462361 | 12/1991 |
| EP | 1837588 | 9/2007 |
| EP | 1930718 | 6/2008 |
| GB | 2462008 | 1/2010 |
| WO | 2006123444 | 11/2006 |
| WO | 2008038754 | 4/2008 |

* cited by examiner

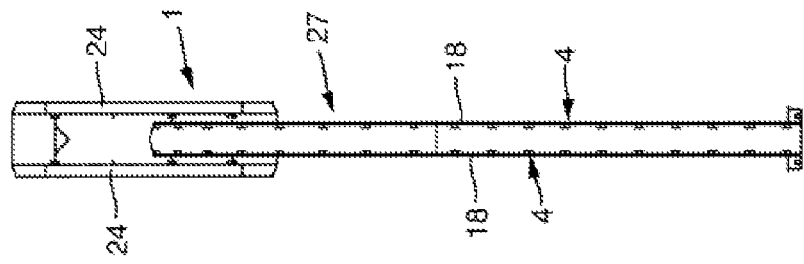
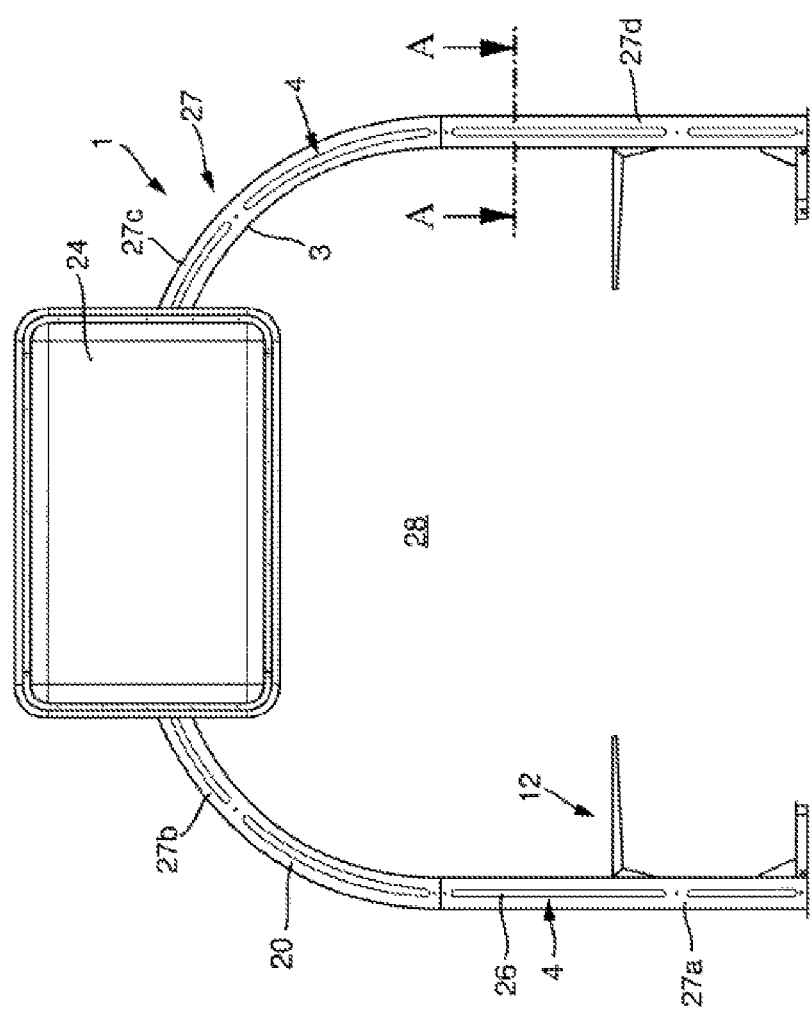

LIGHTING SYSTEM

CROSS-REFERENCE TO RELATED APPLICATION

This application is the U.S. national phase of PCT Application No. PCT/EP2015/050252 filed on Jan. 8, 2015, which claims priority to DE Patent Application No. 20 2014 000 196.0 filed on Jan. 10, 2014, and DE Patent Application No. 20 2014 000 264.9 filed on Jan. 13, 2014, the disclosures of which are incorporated in their entirety by reference herein.

TECHNICAL FIELD

The present invention relates to a lighting device comprising a lighting panel, at least one light source, assigned to a narrow side of the lighting panel, for coupling light into the lighting panel, and a reflector facing a flat side of the lighting panel, wherein the flat side of the lighting panel facing the reflector and/or the reflector is provided with a surface structure.

PRIOR ART

Such lighting devices can be used in buildings or in outdoor spaces and can serve as room illumination, decoration element or design element, with other uses however also being conceivable. In particular, such lighting devices can serve as a structural and/or decoration element of gaming and/or entertainment devices, such as casino machines or other operating terminals.

In order to achieve a high luminosity without a blinding effect, the light emitted in such lighting devices by the at least one light source—for example an LED band or an LED arrangement—is coupled on the narrow side into a relatively large-area lighting panel and emitted by way of the flat side thereof in an at least partly distributed manner. In order to obtain a uniform light distribution in the lighting panel despite the narrow-side light feed, one flat side of the lighting panel can be provided with a light-scattering or light-refractive surface structure, which e.g. can be embodied in the form of printing on the surface. In particular, such a surface structure can be provided in conjunction with a reflector facing the aforementioned flat side of the lighting panel, said reflector reflecting light emerging out of the lighting panel from the aforementioned flat side into the lighting panel or onto the flat side thereof such that the light passes through the aforementioned surface structure at least twice and, to this extent, is scattered multiple times at the surface structure. The light reflected into the lighting panel by the reflector can emerge from the flat side of the lighting panel lying opposite to the reflector.

A lighting device of the aforementioned type is known from the document US 2012/0287631A1, according to which a lighting panel in the form of an acrylic panel is also covered a rear side by a reflector panel, wherein the flat side facing the reflector of the aforementioned panel is provided with a cloud-shaped surface structure in the form of ink printing. The aforementioned cloud-shaped surface structure should in this case have an ever decreasing degree of filling—i.e., so to speak, a reducing cloud density—with increasing distance from the light source arranged on the narrow side. From such a changing filling density of the surface structure, the aforementioned document expects light emission or light transmission, uniform overall over the flat side, into an emission panel placed on the front side in front of the aforementioned acrylic panel.

However, what was found in practice is that the brilliance of the emitted light and the luminosity of the lighting panel are relatively restricted in this known lighting device and, overall, there is relatively diffuse emission. The efficiency, particularly in the edge regions of the lighting panel, is impaired as a result of the surface printing becoming ever denser toward the light sources.

SUMMARY OF THE INVENTION

Proceeding therefrom, the present invention is based on the object of developing an improved lighting device of the aforementioned type, which avoids the disadvantages of the prior art and advantageously develops the latter. In particular, a uniform, brilliant light emission with high luminosity should be achieved by the lighting panel, even with limited powers of the light sources. Preferably, illumination to different sides of the room or a good visibility from different locations should be achieved.

According to the invention, the aforementioned object is achieved by a lighting device in accordance with claim 1. Preferred refinements of the invention are the subject matter of the dependent claims.

Thus, it is proposed to form the surface structure provided between reflector and lighting panel no longer in a cloud-shaped manner but in the form of a line grid made of continuous, crossing lines, said line grid extending uniformly over the flat side of the lighting panel facing the reflector and/or the reflector surface. Surprisingly, high equalization of the light emission from the lighting panel can also be achieved by such a simple line grid, as a result of which it is possible to avoid relatively large transmission losses in the edge regions of the lighting panel, as were known in the prior art.

In an advantageous development of the invention, the surface structure can have a mesh size which remains substantially unchanged over the flat side of the lighting panel and/or an unchanging degree of filling. The surface structure can be embodied to have approximately the same density in edge regions of the panel as in a central region of the lighting panel and various edge regions of the lighting panel and/or of the reflector facing the lighting panel can have a uniformly dense surface structure or a substantially equal grid density or mesh size independently of the arrangement of the light source—for example at only a narrow side of the lighting panel, or else at opposite narrow sides or a plurality of narrow sides of the lighting panel.

Here, the grid lines of the grid structure can have a straight extent, with this however not being mandatory. By way of example, the continuous, crossing grid lines can also have an arcuate or e.g. a sinusoidal extent.

In a development of the invention, the surface structure has a relatively thin embodiment and/or the degree of filling of the surface structure, i.e. the surface portion of the surface structure relative to the unstructured surface portion and/or in relation to the overall area of the lighting panel, is relatively low. This can be achieved by a relatively large mesh size in the case of a relatively small line width. In a development of the invention, the surface structure can have a degree of filling of approximately 1 percent to 25 percent, preferably 5 percent to 15 percent, of the overall surface of the flat side of the lighting panel, wherein the aforementioned degree of filling may also be provided if the surface structure is provided on the reflector surface or on an intermediate layer or an intermediate panel, for example in the form of an intermediate film between the aforementioned lighting panel and the aforementioned reflector.

In an advantageous development of the invention, the line grid can have a mesh size of 2 to 3 mm. A line width can be less than 0.5 mm, in particular approximately in the range from 0.01 to 0.2 mm.

Depending on the line profile, the line grid can have different crossing angles, wherein, preferably, the line profile is embodied in such a way that the crossing angles remain substantially unchanged over the flat side. In principle, a crossing angle of 90 degrees could be considered here, particularly if a straight line profile is provided. However, it was surprisingly found that a crossing angle deviating from 90 degrees is advantageous, in particular a crossing angle in the range from approximately 60 degrees to 80 degrees—or in the range from 100 degrees to 120 degrees when the complementary, larger crossing angle is considered. Even more multifaceted light scattering and hence a greater equalization can be achieved by such an intersection of the grid lines.

Advantageously, the grid lines are arranged at an angle relative to the narrow side of the lighting panel—or to the plurality of narrow sides of the lighting panel—by means of which the light is coupled into the lighting panel from the light source such that the grid lines extend neither parallel nor perpendicular to the aforementioned narrow side.

The grid structure can consist of printing on the panel and/or reflector surface, for example by means of suitable ink or printing color, wherein, however, a different embodiment, for example in the form of surface etching, engraving or milling or grinding, could also be provided where necessary.

Here, in an advantageous development of the invention, the grid lines are not black but have a light embodiment, in particular with a white color or a color similar to white. Transmission losses can be significantly reduced compared to dark or even black printing, but, surprisingly, it is nevertheless possible to obtain a high equalization of the light distribution.

In principle, the light can be emitted from the lighting panel in different ways. In a simple development of the invention, the light can be emitted directly from the lighting panel into which the light is preferably coupled from the narrow side, in particular via the flat side of the lighting panel facing away the from the reflector. Alternatively, or additionally, a further lighting panel and/or emission panel can be disposed downstream of the aforementioned lighting panel into which the light is coupled, for example in such a way that the light which emerges from the flat side of the first panel facing away from the reflector enters into the downstream panel, propagates further in this downstream panel and is emitted by this downstream panel or an even further downstream lighting panel. In particular, such an emission panel can sit with a flat side on the flat side of the lighting panel facing away from the reflector, into which the light is fed, preferably with two-dimensional contact between the two panel flat sides or, alternatively, also forming an intermediate gap.

Here, the lighting device can comprise one or more emission surfaces, wherein a panel flat side—of the first or of a downstream panel—facing away from the reflector, in particular, can serve as emission surface such that the light is emitted substantially across, in particular perpendicular to, the input coupling direction of the light, in which the light is coupled into the lighting panel on the narrow side.

Alternatively, or additionally, provision can also be made in a development of the invention of an emission surface which is aligned substantially across the flat side of the lighting panel such that the light is emitted substantially parallel to the plane in which the light is coupled into the lighting panel on the narrow side. Advantageously, this emission surface with a transverse alignment is arranged offset from the incoming radiation plane such that the light coming from the light source assumes a step-shaped or stair-shaped propagation or emission path through the lighting panel.

By way of such an embodiment of the lighting panel or arrangement of the emission surface, the lighting device is able, so to speak, to shine around the corner and illuminate a spatial region to the side of the flat side of the lighting panel.

In an advantageous development of the invention there can be a multi-axis emission or the lighting device can have a plurality of chief emission directions which are preferably perpendicular to one another. In an advantageous development of the invention, the lighting panel and/or emission panel can have an emission surface formed by the flat side of the panel facing away from the reflector and at least one further emission surface formed by a narrow side of the aforementioned lighting panel and/or emission panel.

Advantageously, the aforementioned lighting panel and/or emission panel can comprise a narrow side which is surrounded by a device housing, with the light being coupled into the aforementioned panel by way of said narrow side, wherein, in particular, the at least one light source, for example in the form of an LED arrangement, can be arranged between an inner side of the aforementioned device housing and the aforementioned panel narrow side. In addition to this input coupling narrow side, the aforementioned lighting panel, or a downstream emission panel, can comprise a further panel narrow side which is not covered by the aforementioned device housing and/or which projects out of the device housing and/or which is arranged in an exposed manner such that there can be light emission via this aforementioned further end side. The aforementioned further panel narrow side can lie in the plane of the input coupling narrow side, but advantageously it can also be arranged offset in relation to the input coupling narrow side in a direction perpendicular to the panel flat side such that an overall stair-shaped or step-shaped light course emerges through the panel or the panels between the light source and the aforementioned exit narrow side.

The lighting device can have various forms and embodiments. In an advantageous development of the invention, the lighting device can be embodied as a preferably arcuate portal in the style of a gate, which spans a clear space and/or has a self-supporting embodiment. The portal can have a floor contact area or feet and can be able to be put up freely on the floor in a self-supporting manner. Alternatively, or additionally, the portal can be connected to a structure to be spanned, for example a gaming table, or anchored thereon.

Advantageously, the portal can have a modular design and be assemblable from a plurality of portal parts, in particular straight base parts and at least one bent and/or kinked connection part, wherein the portal parts are preferably contoured in such a way that the portal parts can be brought into holding engagement with one another in an interlocking manner, in particular are pluggable into one another, such that the portal parts together form a stiff portal structure.

At least one display device for displaying information can be arranged on the portal, preferably in the region of a portal top or upper restriction region, wherein, for example, two screens aligned toward opposite sides can be provided. The display device can be fastened to the portal or mounted at a different position.

Advantageously, the portal can be used to span a gaming and/or entertainment machine such as a gaming table in a casino or gaming establishment, or else for spanning other structures to be highlighted, such as delivery tables in warehouses, or else it can be used outdoors.

BRIEF DESCRIPTION OF THE DRAWINGS

Below, the invention will be explained in more detail on the basis of a preferred exemplary embodiment and associated drawings. In the drawings:

FIG. 4 shows a side view of the overall arcuate lighting device and the arrangement thereof over a gaming table, FIG. 5 shows a lateral plan view of the lighting device from FIG. 4.

IMPLEMENTING THE INVENTION

Figure 1:
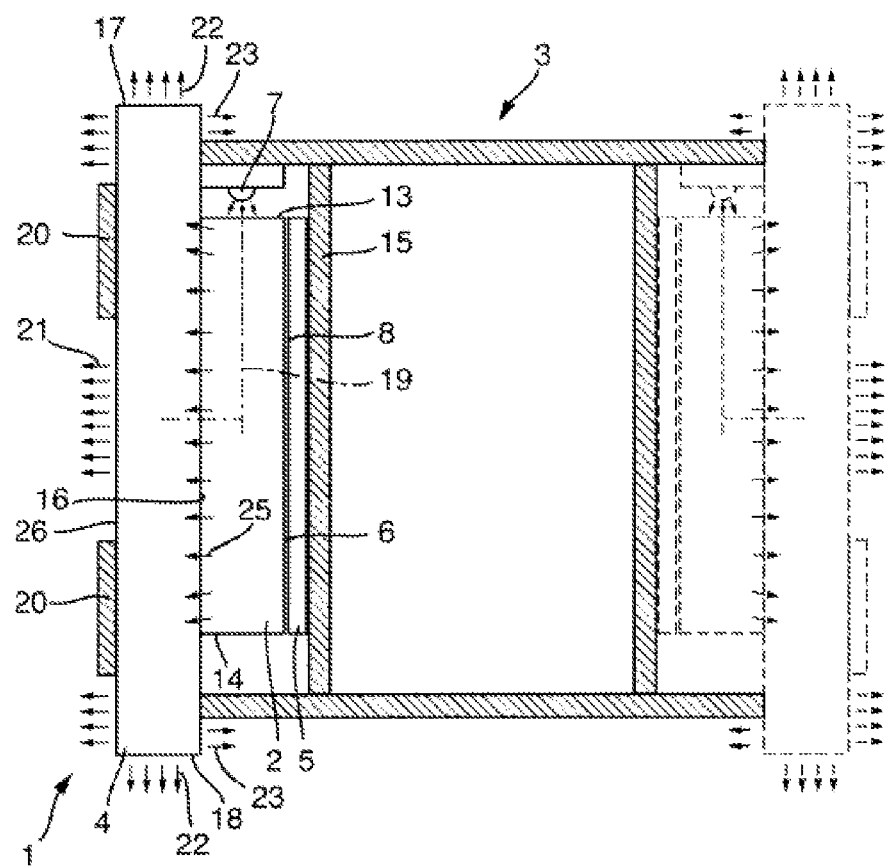
FIG. 1 shows a cross section through a lighting device along the line A-A in FIG. 4 according to an advantageous embodiment of the invention, said cross section showing the arrangement of a lighting panel in a device housing and the assignment of the light source to the lighting panel, and showing the arrangement of a reflector at a panel rear side.

As shown in FIGS. 4 and 5, the lighting device 1 can be embodied in the form of a lighting arc or lighting portal which can arc in the style of a doorframe or in the style of a doorway arch over a gaming table 12, for example in the form of a roulette table, or a different gaming or entertainment machine, or which can span a clear space 28. Here, the lighting device 1 can have a—loosely speaking—rectangular or box-shaped cross section, the flat sides of which extend to the outer sides and inner sides of the aforementioned lighting arc and the narrow sides of which can extend in the passage direction of the lighting arc. However, it is understood that the lighting device can also have different contouring and different geometries.

As shown by FIGS. 4 to 7, the gate or the portal 27, into which the lighting device 1 is integrated, can have a modular design and be assemblable from a plurality of portal parts, in particular straight base parts 27a and 27d and at least one, or a plurality of, bent and/or kinked connection parts 27b and 27c, wherein the portal parts 27a-d are preferably contoured in such a way that the portal parts 27a-d can be brought into holding engagement with one another in an interlocking manner, in particular are pluggable into one another, such that the portal parts 27a-d together form a stiff portal structure.

Figure 2:
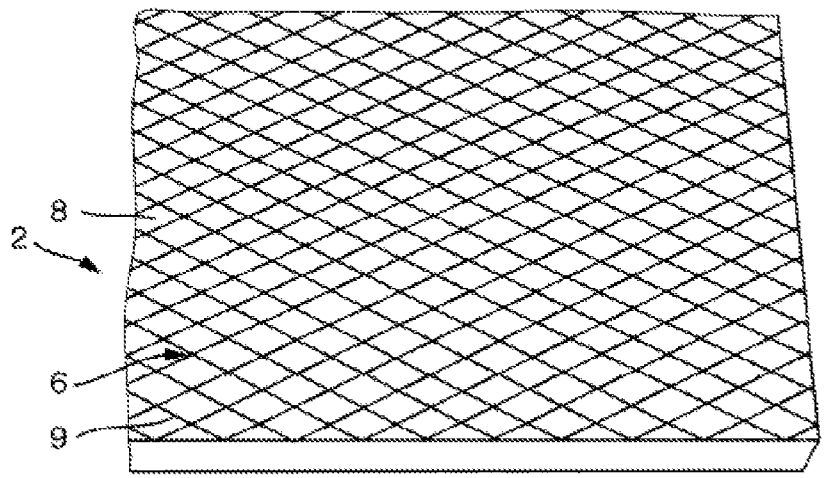
FIG. 2 shows a perspective plan view on the flat side of the lighting panel from FIG. 1, provided with a grid surface structure, said perspective plan view showing the line grid made of continuous, crossing grid lines.
Figure 3:
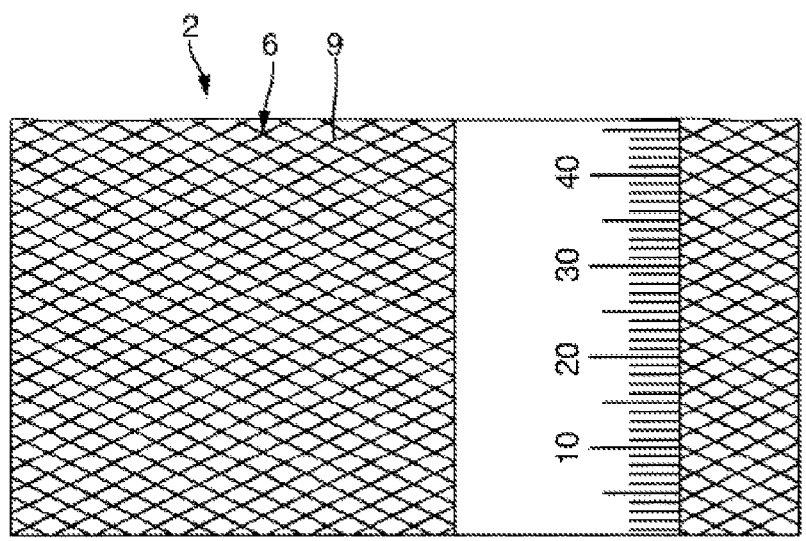
FIG. 3 shows a frontal plan view of the line grid of the lighting panel from FIG. 2, said frontal plan view elucidating the mesh size and line width.
Figure 6:
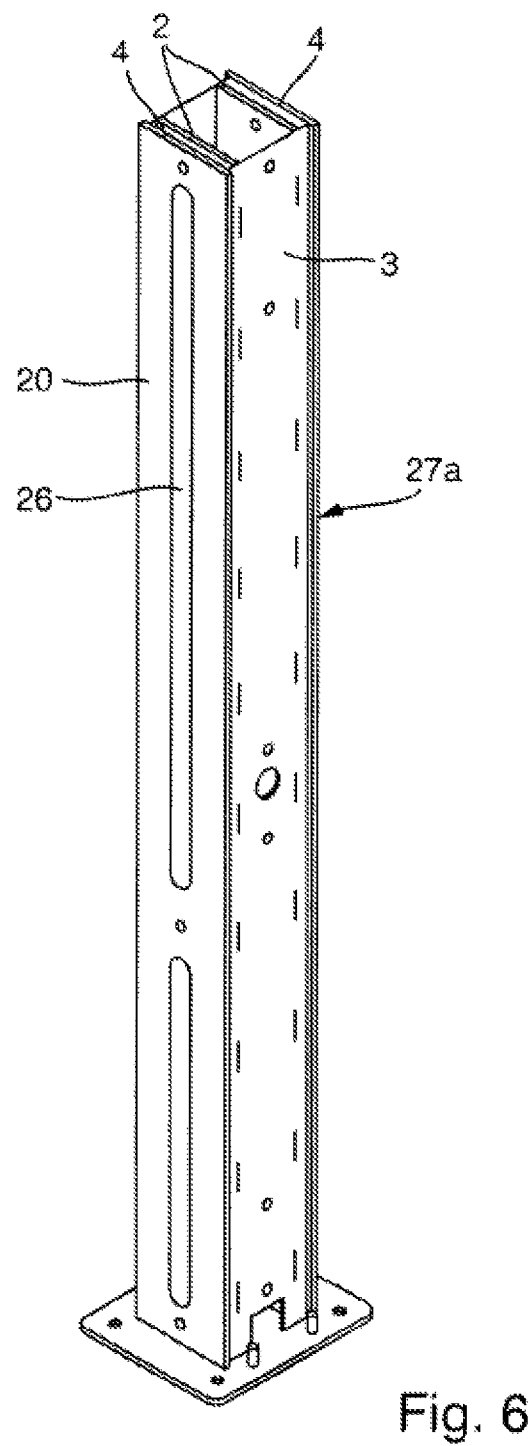
FIG. 6 shows a perspective side view of a post-shaped portal base part of the lighting portal from FIGS. 4 and 5.
Figure 7:
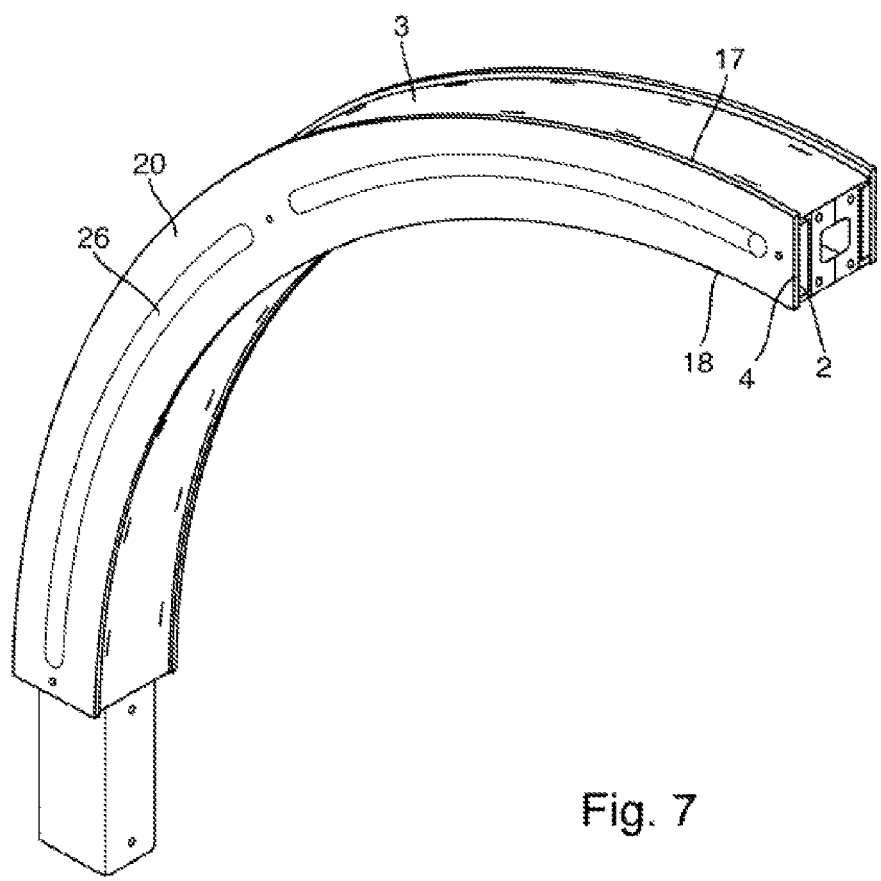
FIG. 7 shows a perspective side view of an arcuate portal base part of the lighting portal from FIGS. 4 and 5, which can be assembled with the post-shaped portal base part from FIG. 6.

As FIGS. 1 to 3 show, the gate-shaped lighting device can comprise a plate-shaped, in particular plane, lighting panel 2 which can be arranged in a preferably box-shaped device housing 3. As shown in FIG. 1, the device housing 3 can surround the narrow sides 13 and 14 of the aforementioned lighting panel 2 in particular and also cover a rear side or a rear-side flat side 8 with a housing wall 15.

As shown with a dashed representation in FIG. 1, two such lighting panels 2 can be integrated into the device housing 3, which lighting panels can advantageously be aligned toward opposite sides. If the lighting device 1 is embodied in the form of a lighting arc or lighting portal, as is shown in FIGS. 4 and 5, the aforementioned lighting panels 2 can be oriented toward the end sides of the lighting arc.

A light source 7 in the form of an LED band or another LED arrangement can be assigned to the aforementioned narrow sides 13 and 14 of the lighting panel 2 such that the light source 7 radiates light into at least one of the aforementioned narrow sides 13 and 14 such that the light is coupled into the lighting panel. In particular, the light source 7 can be arranged directly opposite to the aforementioned narrow side 13 or 14, for example be fastened to the inner side of the device housing 3.

A reflector 5 is assigned to a flat side 8 of the lighting panel 2 facing the housing interior, said reflector capturing light emerging from the aforementioned flat side 8 and reflecting it into the lighting panel 2. The aforementioned reflector 5 can likewise have a panel-shaped or plate-shaped, in particular plane, embodiment and can sit directly on the aforementioned flat side 8 of the lighting panel 2 or be arranged with a slit-shaped distance therefrom. By way of example, the reflector 5 can form a reflector panel or it can be applied onto the flat side 8 in the form of a reflector film or reflector coating.

As FIGS. 2 and 3 show, a surface structure 6 embodied as a line grid is provided on the flat side 8 of the lighting panel 2 facing the reflector 5, which line grid can consist of continuous, crossing grid lines 9 which may be printed onto the lighting panel 2, for example in the form of an ink or colored print. Advantageously, the aforementioned grid lines 9 or the surface structure 6 is/are embodied in white or a color which is similar to white or very light.

As FIGS. 2 and 3 show, the grid lines 9 can have a straight profile and intersect under a crossing angle of approximately 60 to 80 degrees. The degree of filling of the surface structure 6 is advantageously relatively low, in particular embodied in the range set forth at the outset. By way of example, this can be obtained by the ratio, visible in the figures, of a relatively large mesh size to a relatively thin line width. Advantageously, the mesh size can be in the range of a couple millimeters, e.g. 2 to 3 mm, while the line width can be only a fraction of a millimeter, for example in the range from 0.05 to 0.5 mm.

Advantageously, the mesh size can have an unchanging mesh size and/or an unchanging degree of filling over the whole area of the lighting panel 2 or the whole lighting panel portion provided with the surface structure 6, i.e. the density of the grid structure substantially does not change over the extent of the lighting panel 2.

By way of the aforementioned surface structure 6, the light, which wants to emerge from the lighting panel 2 via the flat side 8 toward the reflector 5 or which is reflected by the reflector 5 into the lighting panel 2, can be scattered and accordingly equalized.

FIG. 1 shows a light source 7 on only one narrow side 13 of the lighting panel 2; however, provision can also be made of light sources 7 at a plurality of narrow sides. The narrow sides within the device housing 3 not provided with light sources 7 can have a mirrored embodiment so as to avoid transmission losses here.

The equalized light can emerge from the lighting panel at the flat side of the lighting panel 2 lying opposite the reflector 5, as elucidated by the arrows 25 in FIG. 1, or it can enter into a downstream emission panel 4, which is, in particular, placed onto the lighting panel 2, said emission panel 4 having emission surfaces not surrounded in front of the device housing 3. Here, in particular, a flat side 16 of the lighting panel 2 and/or a flat side 26 of the aforementioned emission panel 4 which is distant from the reflector 5 can serve as an emission surface. The light emission from said flat side 26 is elucidated by the arrows 21. Alternatively, or additionally, narrow sides 17 and 18 of the emission panel 4 can form light exit or emission surfaces, which can extend across, or approximately perpendicular to, the surface-structured flat side 8 of the lighting panel 2 and which can be arranged offset in relation to the light entrance narrow side such that the light emitted by the light sources 7 can, so to speak, be emitted around the corner through the lighting panel 2 and the emission panel 4, as elucidated by arrows 22 and 23 in FIG. 1.

The beam path 19 through the lighting panel 2 and emission panel 4 can have stair-shaped contouring, if the chief input radiation direction and the corresponding chief emission direction are considered, cf. FIG. 1.

The lighting panel 2, the emission panel 4 and/or the reflector panel 5 can consist of various materials, for example a light-transmissive plastic such as Plexiglas or glass in each case, wherein the reflector panel 5 may have a reflecting or mirroring coating. In particular, the lighting panel 2 can be embodied as scattering Plexiglas, the emission panel 4 as light Plexiglas and/or the reflector panel 5 as mirroring Plexiglas.

Figure 8:
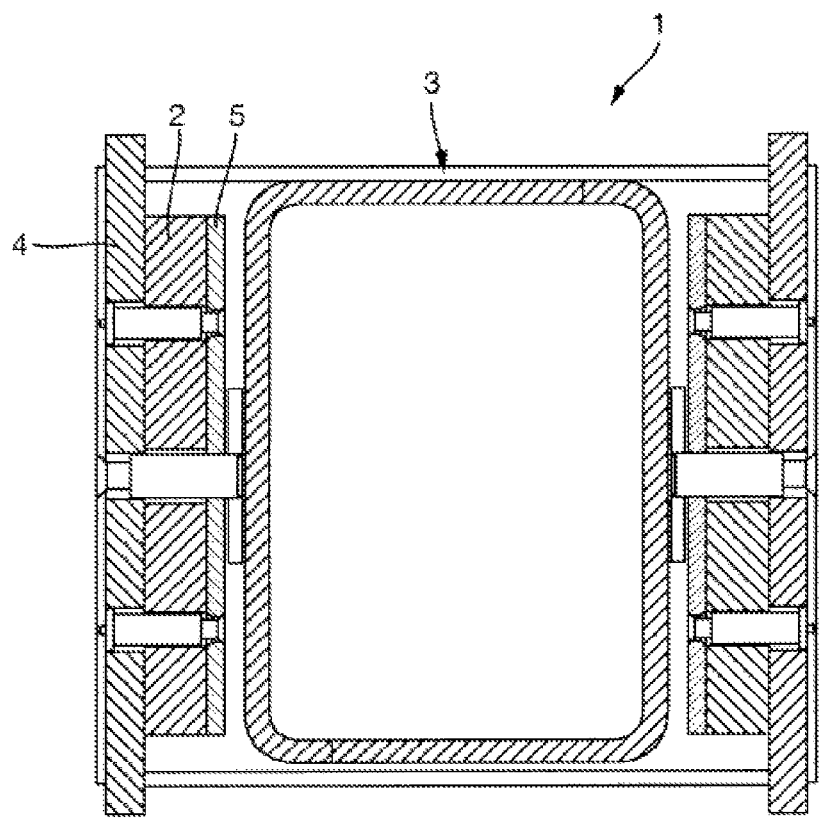
FIG. 8 shows a sectional view of a portal part from FIG. 6 or 7, which shows the integration of the lighting device functional components into the portal and the arrangement thereof in relation to one another.

The lighting panel 2, the emission panel 4 and/or the reflector panel 5 can be securely connected to one another and/or joined on one another under mutual bearing pressure, for example held on one another by way of screws or other connecting elements such as rivets, pins or the like, cf. FIG. 8. Advantageously, the lighting panel 2, the emission panel 4 and the reflector panel 5 can form a pre-assemblable assemblage and be installed together.

As FIG. 1 and FIG. 5 show, stop elements 20 can be attached to the emission surface of the emission panel 4, in particular on the flat side thereof, said stop elements covering part of the emission surface and preventing light emergence there. In particular, the aforementioned stop elements 20 can have a mirrored or at least strongly reflecting embodiment, for example in the form of a chrome-plated or polished metal surface.

As FIGS. 4 and 5 show, the lighting device 1 can be combined with a display device, for example in the form of a screen 24, in particular a flat screen or the like. By way of example, such a screen 24 can be arranged in an upper and/or easily visible region, in particular in the region of the culmination point of the lighting arc, wherein the screen 24 can be mounted on the lighting device 1 or else separately therefrom.

The invention claimed is:

1. A lighting system comprising:
    a plurality of lighting devices each comprising
        a lighting panel, at least one light source, assigned to a narrow side of the lighting panel, for coupling light into the lighting panel, and
        a reflector panel facing a flat side of the lighting panel, wherein the flat side of the lighting panel facing the reflector panel or an intermediate layer between the reflector panel and the lighting panel is provided with a surface structure, wherein the surface structure is embodied as a line grid made of continuous, crossing grid lines, and
    an arc structure of a modular design, assemblable from a plurality of modular arc parts, including straight base parts, arcuate parts and at least one connection part, wherein the arc parts are contoured in such a way that they can be brought into holding engagement with one another in an interlocking manner,
    wherein the plurality of lighting devices are affixed to the arc structure.

2. The lighting device as claimed in claim 1, wherein the surface structure has a mesh size which remains unchanged over the flat side of the lighting panel and/or an unchanging degree of filling.

3. The lighting device as claimed in claim 1, wherein the surface structure has a degree of filling of 3 percent to 25 percent, of the overall surface of the flat side of the lighting panel.

4. The lighting device as claimed in claim 1, wherein the surface structure has a mesh size in the range from 2 to 3 mm.

5. The lighting device as claimed in claim 1, wherein the grid lines have a line width of less than 0.5 mm.

6. The lighting device as claimed in claim 1, wherein the grid lines have a straight extent.

7. The lighting device as claimed in claim 1, wherein the grid lines cross at a crossing angle of 60 degrees to 80 degrees.

8. The lighting device as claimed in claim 1, wherein the grid lines have a white embodiment.

9. The lighting device as claimed in claim 1, wherein the grid lines extend inclined at an acute angle in relation to the at least one narrow side, so that the light from the light source is coupleable into the lighting panel.

10. The lighting device as claimed in claim 1, further comprising an emission panel affixed to a side of the lighting panel opposite the reflector panel, the emission panel have a flat light exit face.

11. The lighting device as claimed in claim 10, wherein a multi-axis emission is provided and the lighting device has a plurality of chief emission directions, wherein, a first chief emission direction is aligned perpendicular to the flat side of the lighting panel and a further secondary emission direction is aligned substantially parallel to the flat side of the lighting panel.

12. The lighting device as claimed in claim 10, wherein the lighting panel or the emission panel has a panel narrow side, which forms a light exit and/or emission surface and which is arranged in an exposed manner relative to a housing in such a way that light is emittable to the surroundings of the housing.

13. The lighting device as claimed in claim 10, wherein the emission panel narrow side forming a emission surface is arranged offset with respect to the lighting panel narrow side so that light is coupleable into the emission panel, in a direction perpendicular to the flat side of the lighting panel.

14. The lighting device as claimed in claim 10, wherein the light from the at least one light source has, at least in part, a stair or step-shaped light path through the lighting panel or the emission panel.

15. The lighting device as claimed in claim 1, further comprising an emission panel affixed to a side of the lighting panel opposite the reflector panel, the emission panel have a flat light exit face and a narrow side edge, extending across along the edge of the flat light exit face forming a light emission surface.

16. The lighting device as claimed in claim 1, wherein the lighting panel is surrounded at least in part by a device housing, said device housing covering the lighting panel narrow side, so that the light from the at least one light source is coupleable into the lighting panel, wherein the at least one light source is arranged between an inner side of the device housing and the lighting panel narrow side.

17. A lighting system comprising:
a plurality of lighting devices each comprising:
a lighting panel, at least one light source, assigned to a narrow side of the lighting panel, for coupling light into the lighting panel, and
a reflector panel facing a flat side of the lighting panel, wherein the flat side of the lighting panel facing the reflector panel or an intermediate layer between the reflector panel and the lighting panel is provided with a surface structure, wherein the surface structure is embodied as a line grid made of continuous, crossing grid lines,
an arcuate portal structure of a modular design, which is sized to span a clear space in a self-supporting manor, the arcuate portal structure supporting the plurality of lighting devices, and
at least one display device for displaying information affixed on the arcuate portal in a an arcuate portal top region, the at least one display device having two screens aligned toward opposite sides of the arcuate portal region.

18. The lighting device as claimed in claim 17, further comprising an emission panel affixed to a side of the lighting panel opposite the reflector panel, the emission panel have a flat light exit face and a narrow side edge, extending along the edge of the flat light exit face forming a light emission surface.

19. A lighting system comprising:
a plurality of lighting devices each comprising:
a lighting panel, at least one light source, assigned to a narrow side of the lighting panel, for coupling light into the lighting panel, and
a reflector panel facing a flat side of the lighting panel, wherein the flat side of the lighting panel facing the reflector panel or an intermediate layer between the reflector panel and the lighting panel is provided with a surface structure, wherein the surface structure is embodied as a line grid made of continuous, crossing grid lines,
an arc structure, which is sized to span a gaming machine or gaming table in a self-supporting manor, the arc structure supporting the plurality of lighting devices, and
at least one gaming table oriented within the arc structure.

* * * * *

UNITED STATES PATENT AND TRADEMARK OFFICE
CERTIFICATE OF CORRECTION

PATENT NO. : 9,939,574 B2
APPLICATION NO. : 15/110817
DATED : April 10, 2018
INVENTOR(S) : Marek Gawel et al.

Page 1 of 1

It is certified that error appears in the above-identified patent and that said Letters Patent is hereby corrected as shown below:

Column 8, Line 41, Claim 10:
After "the emission panel"
Delete "have" and
Insert -- has --.

Column 8, Line 57, Claim 13:
After "narrow side forming"
Delete "a" and
Insert -- an --.

Column 8, Line 67, Claim 15:
After "the emission panel"
Delete "have" and
Insert -- has --.

Column 9, Line 1, Claim 15:
After "narrow side edge, extending"
Delete "across"

Column 9, Line 28, Claim 17:
After "the arcuate portal in"
Delete "a"

Column 10, Line 6, Claim 18:
After "the emission panel"
Delete "have" and
Insert -- has --.

Signed and Sealed this
Fourteenth Day of August, 2018

Andrei Iancu
*Director of the United States Patent and Trademark Office*